Sept. 20, 1927.
E. A. MAY
1,642,931
COMPUTING GAUGE OR SCALE FOR GASOLINE STATION PUMPS
Filed May 14, 1925
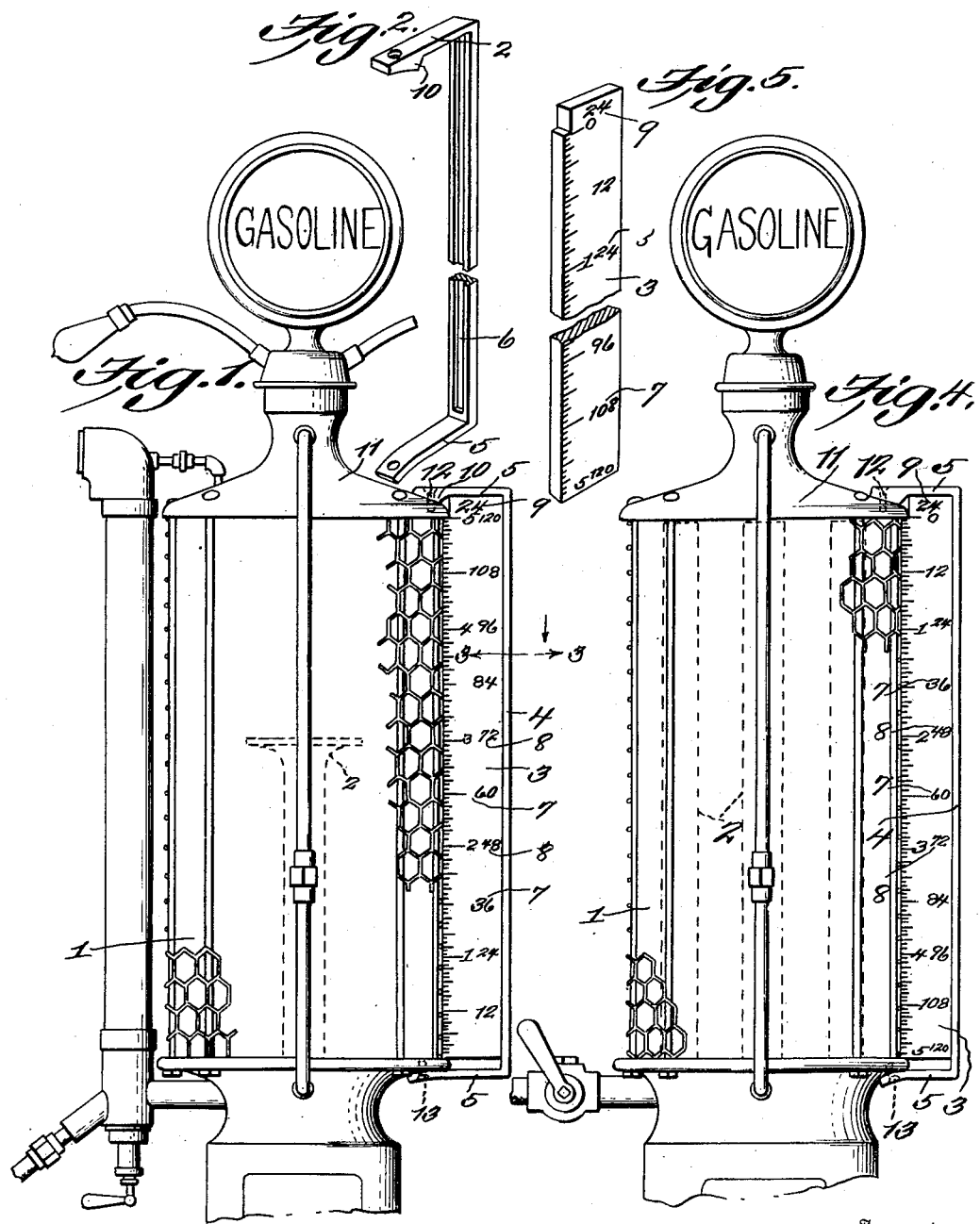
Inventor
Enoch A. May,
By R. W. Boswell,
his Attorney

Patented Sept. 20, 1927.

UNITED STATES PATENT OFFICE.

ENOCH A. MAY, OF JACKSON, MISSISSIPPI.

COMPUTING GAUGE OR SCALE FOR GASOLINE-STATION PUMPS.

Application filed May 14, 1925. Serial No. 30,213.

At present there are no devices for computing the prices for gasoline per gallon or fractions thereof, at the time of dispensing the gasoline, that is at the same time of measuring the fluid.

Therefore, it is the purpose of the present invention to provide an improved computing scale or gauge with improved means for attaching the same adjacent the dispensing vessel of the pump, especially the Fry and Standard types of pumps; the scale or gauge being such that it may be interchanged. For instance a gasoline station may be equipped with a number of gauges or scales of computing type having various prices, for instance ranging from sixteen to thirty cents per gallon. The price per gallon may be located at the top of each scale, and in keeping with the price the calibrations on the scale have the computing prices for the number of gallons or fractions thereof, so that when the dispensing vessel fills with the fluid and the level of the fluid stops at the number of gallons to be sold the computed price thereof will be indicated and may be easily read from the scale. For example, if there is to be three gallons dispensed and the price is twenty-four cents per gallon, the computed price will be seventy-two cents.

As the prices of gasoline per gallon change, the scale or gauge can be easily removed and another scale or gauge applied according to the changed price of gasoline per gallon.

Another purpose is to provide an improved means for easily attaching a computing scale or gauge to the side of the dispensing vessel, holding the same firm and in relatively close proximity to the surface of the vessel, whereby the level of the fluid may be easily measured up with the calibrations on the gauge, at the same time permitting the computed price to be noted, saving considerable time for the attendant at the station, and also allowing the customer to know the amount to be paid instantly.

Still another purpose is to construct said holding means with a groove or seat for the reception of the marginal edge of the gauge or scale, the holding means being in the form of a bar to hold the gauge rigid.

It is to be noted that the invention in nowise is to be limited in its details, it being obvious that the device when reduced to practice may be subjected to modifications falling within the scope of what is claimed.

The invention comprises further features and combinations of parts hereinafter set forth, illustrated and claimed.

Figure 1 is a view in elevation of a gasoline dispensing pump of the Fry type, though any style of pump may be equipped with the invention, with the present type of gauge or scale applied;

Fig. 2 is a detail perspective view of the holder for attaching the computing scale or gauge to the side of the vessel;

Fig. 3 is a detail cross-sectional view on line 3—3 of Fig. 1; and

Fig. 4 is a view in elevation of a standard type of pump, showing the improved computing scale or gauge and its attaching means applied.

Fig. 5 is a detail view of the scale or gauge.

Referring to the drawings, 1 designates a dispensing pump for a gasoline station, and which is of the Fry type as in Fig. 1, wherein a movable spray feed is employed, indicated at 2. This spray feed is capable of being set for the purpose of allowing the required amount of gasoline to be dispensed from the vessel. The vessel fills, and if the spray feed is placed for dispensing three gallons, the amount of gasoline above the spray feed passes out of the vessel and returns to the storage tank in the station, until the level of the fluid reaches the end of the spray feed, then the amount of gasoline below the feed dispenses and passes into the tank of the automobile. When the level reaches this point three gallons may be denoted on the scale or gauge 3. In addition to reading the measured amount of fluid the purchaser may readily note the computed price seventy-two cents at the rate of twenty-four cents per gallon.

The gauge or scale may be made of any suitable material, preferably metal, and is positioned in relatively close proximity to the surface of the dispensing vessel. However on all dispensing vessels of pumps there are protecting covers of wire fabric or mesh work, hence the edge of the gauge or scale is positioned a distance from the surface of the vessel equal to the diameter of the wire, hence the space is no more than substantially a quarter of an inch from the surface of the vessel, in some instances possibly less. In this way the level of the gasoline may easily measure up with the calibration which indicates the amount to be dispensed.

In Fig. 1 the holder 4 is in the form of a bar having upper and lower lateral ends 5 which overlie the top and bottom of the vessel. The vessel is usually glass, while the top and bottom are of metal. The perpendicular portion of the holder or bar has its inner surface grooved as shown at 6 for the reception of the edge of the scale or gauge. The lower end of the groove terminates short of the lower lateral end of the bar or holder, so as to hold the gauge or scale in proper position. The scale or gauge has calibrations indicating five gallons and fractions thereof, and adjacent the calibration of each gallon there is the computed price. The computed prices for half gallons are indicated as at 7 while the computed prices per gallon are designated by the numeral 8. If need be the intervening fractions may have computed prices. It is to be noted that the gauge or scale may be long enough to provide for measuring and computing more than five gallons, though such amount is sufficient for illustrative purposes. The upper end of each of a plurality of scales or gauges as may be on the premises of a gasoline station is provided with the price per gallon, as indicated at 9. This price and the calibrations below may be on both sides of the scale or gauge, though only one side is illustrated. Should gasoline drop below twenty-four cents per gallon, the computing scale as shown may be removed and another substituted, the same method being used in case gasoline should increase in price per gallon.

The upper end of the holder or bar has a projection 10 which depends over the inner edge of the scale or gauge, and the extremity of the upper end of the bar is secured to the top 11 of the dispensing vessel, by means of a screw 12. A screw 13 secures the lower end of the bar or holder to the bottom of the vessel. It is obvious that any other attaching means for securing the holder or bar may be employed. In order to detach one scale or gauge for the substitution of another, the lower lateral end may be disconnected, and the gauge or scale drawn downwardly, that is by first bending the bar outwardly to permit of the removal of the scale.

Referring to Fig. 4 it will be noted that the scale or gauge is applied to a conventional Standard type of pump, wherein the gasoline is dispensed in a different manner than in a Fry type of pump. However the scale or gauge is attached similar to that shown in Fig. 1.

While Fig. 1 discloses a computing scale reading from the bottom upward, for measuring and computing the price of the gasoline as it enters the vessel, it will be seen that the scale in Fig. 4 reads from the top downward. In this latter instance the gasoline is measured and its price computed as it is dispensed, and the spray feeds are at all times in raised positions, the vessel being likewise filled, so that when a purchaser decides on the amount of gasoline required, the gasoline is allowed to flow, and as the level of the fluid descends and reaches the required amount as indicated on the scale, notice is given to the operator to cut off the supply. The amount according to the scale may be observed and the computed price noted.

The invention having been set forth, what is claimed is:

1. In combination with a vessel of a computing scale fitting adjacent the side of the vessel, and a holder conforming to the perpendicular edge of the scale provided with a longitudinal seat for the reception of the edge of the scale, said holder having attaching terminals with means for detachably connecting the same to the top and bottom of the vessel, whereby one scale may be substituted for another.

2. In combination with a vessel of a computing scale fitting adjacent the side of the vessel, a holder comprising an elongated bar with lateral attaching terminals at its opposite ends overlying the top and bottom of the vessel, said bar conforming to the length of the scale with its inner surface grooved for the reception of one edge of the scale, holding the opposite edge adjacent the surface of the vessel, and means for detachably connecting the lateral terminals to the top and bottom of the vessel so that either end or both may be disconnected, whereby one scale may be substituted for another.

3. In a device as set forth, the combination with a measuring and computing scale for use adjacent a dispensing vessel, top and bottom members for the vessel, of a holder provided with upper and lower lateral ends, the former overlying the top of the vessel, the latter underlying the bottom of the vessel, one edge of the holder operatively engaging an edge of the scale to hold the scale in parallelism to the side of the vessel, and means for connecting the terminal portions of the lateral ends to the top and bottom of the vessel.

4. The combination with a measuring and computing scale positioned adjacent to and in parallelism with the side of a vessel, of an elongated holder consisting of a bar to operatively engage with the edge of the scale remote from the vessel, said bar having upper and lower lateral end portions overlying the upper and lower ends of the scale, and having their terminal parts overlying the top and bottom of the vessel, and fastening devices for securing the terminal parts to the top and bottom of the vessel.

5. The combination with a measuring and computing scale for disposition adjacent to and in parallelism with the side of a vessel, of a holder consisting of a bar provided with a longitudinal seat for the reception of an edge of the scale, said bar having upper and lower lateral parts overlying the ends of the scale and having their terminal portions overlying the top and bottom of the vessel, and means for attaching the terminal portions to the top and bottom of the vessel.

In witness whereof, the inventor's signature is hereunto affixed.

ENOCH A. MAY.